Dec. 6, 1960  R. D. LAMBERT  2,963,227
DEVICE FOR REMOTELY WINDING A REEL
Filed June 6, 1958  3 Sheets-Sheet 1
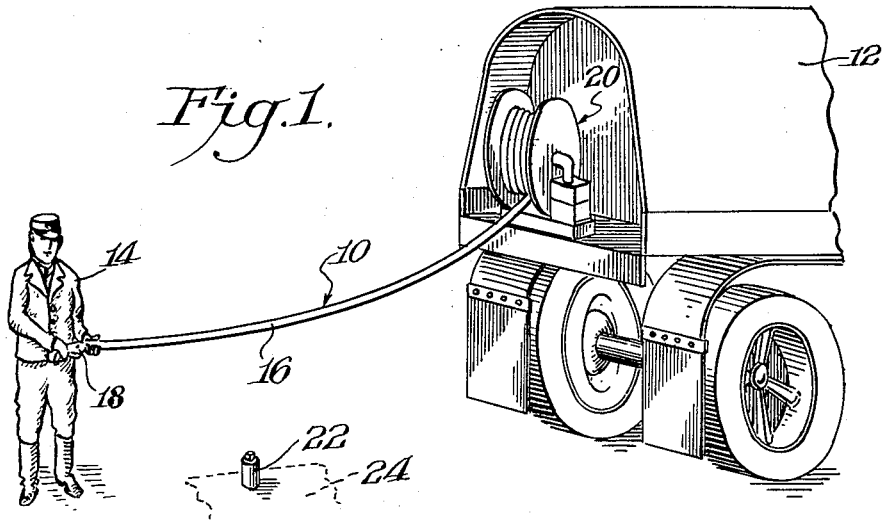
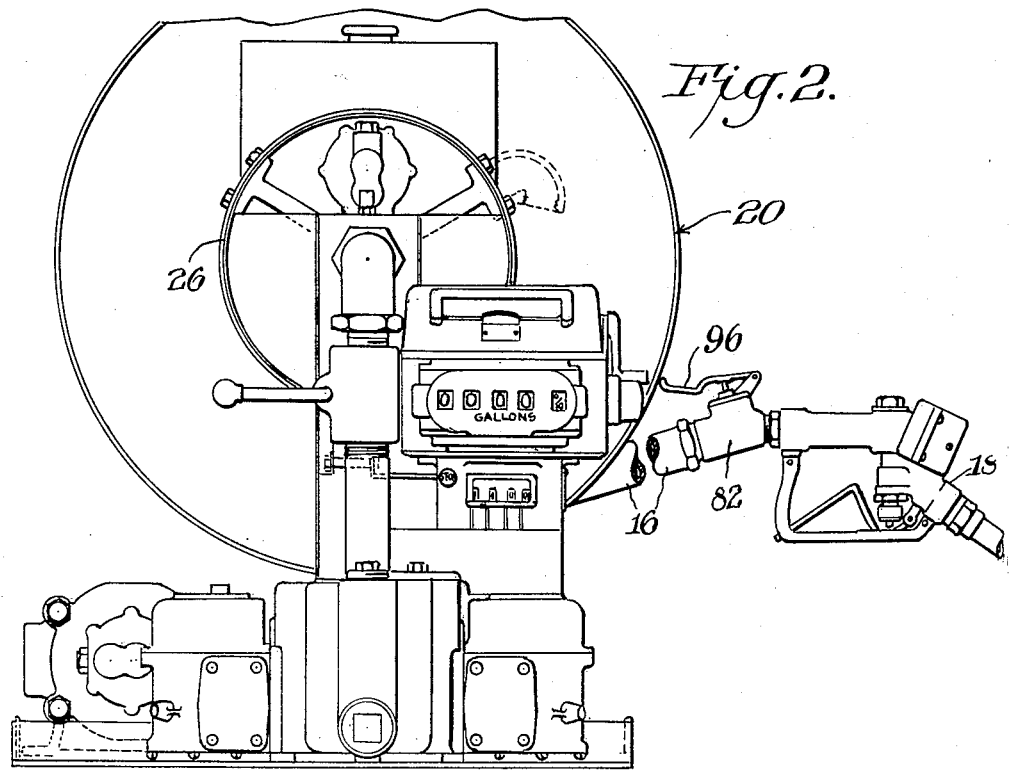
INVENTOR
Robert D. Lambert
BY
ATTORNEY

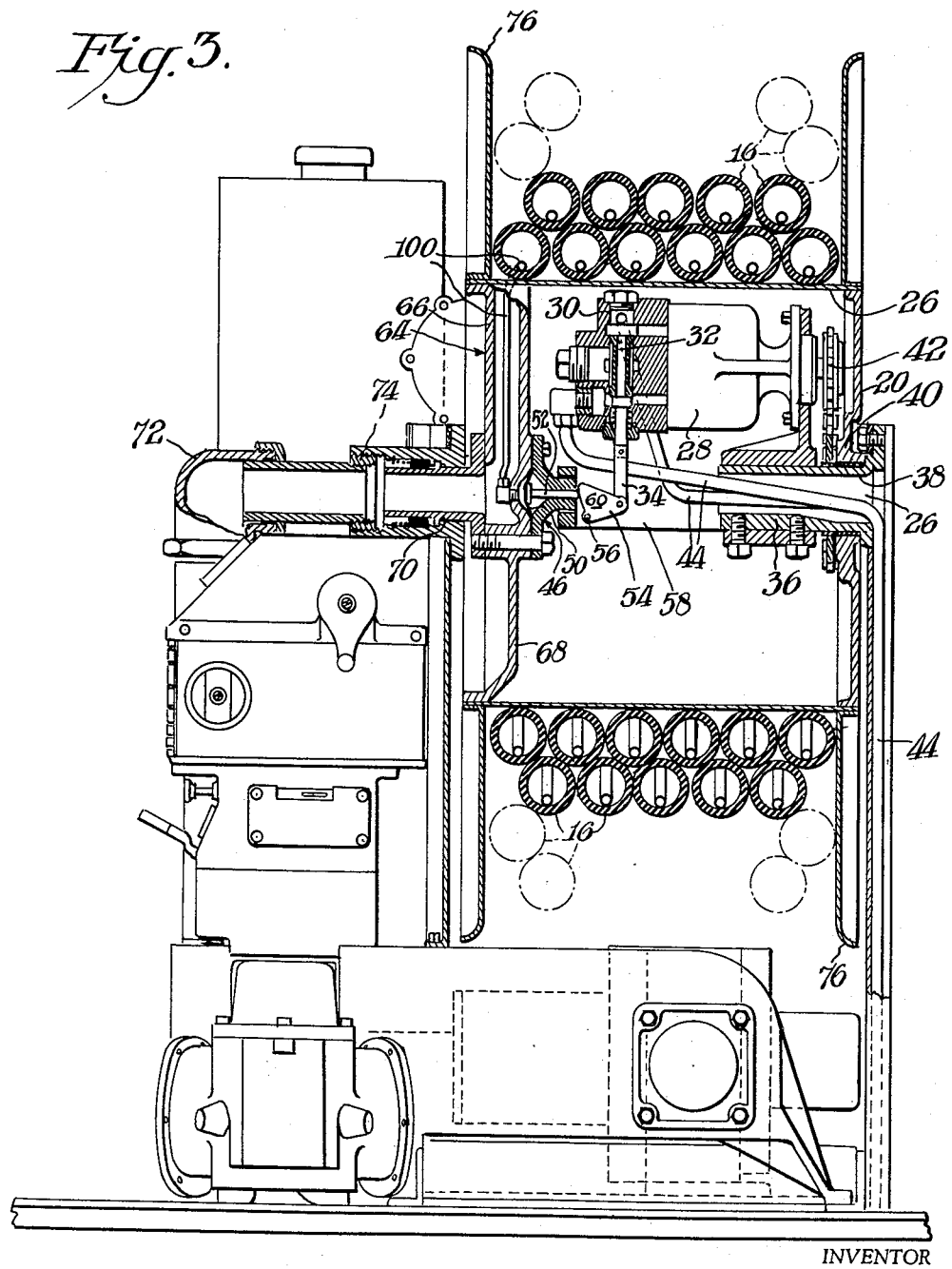

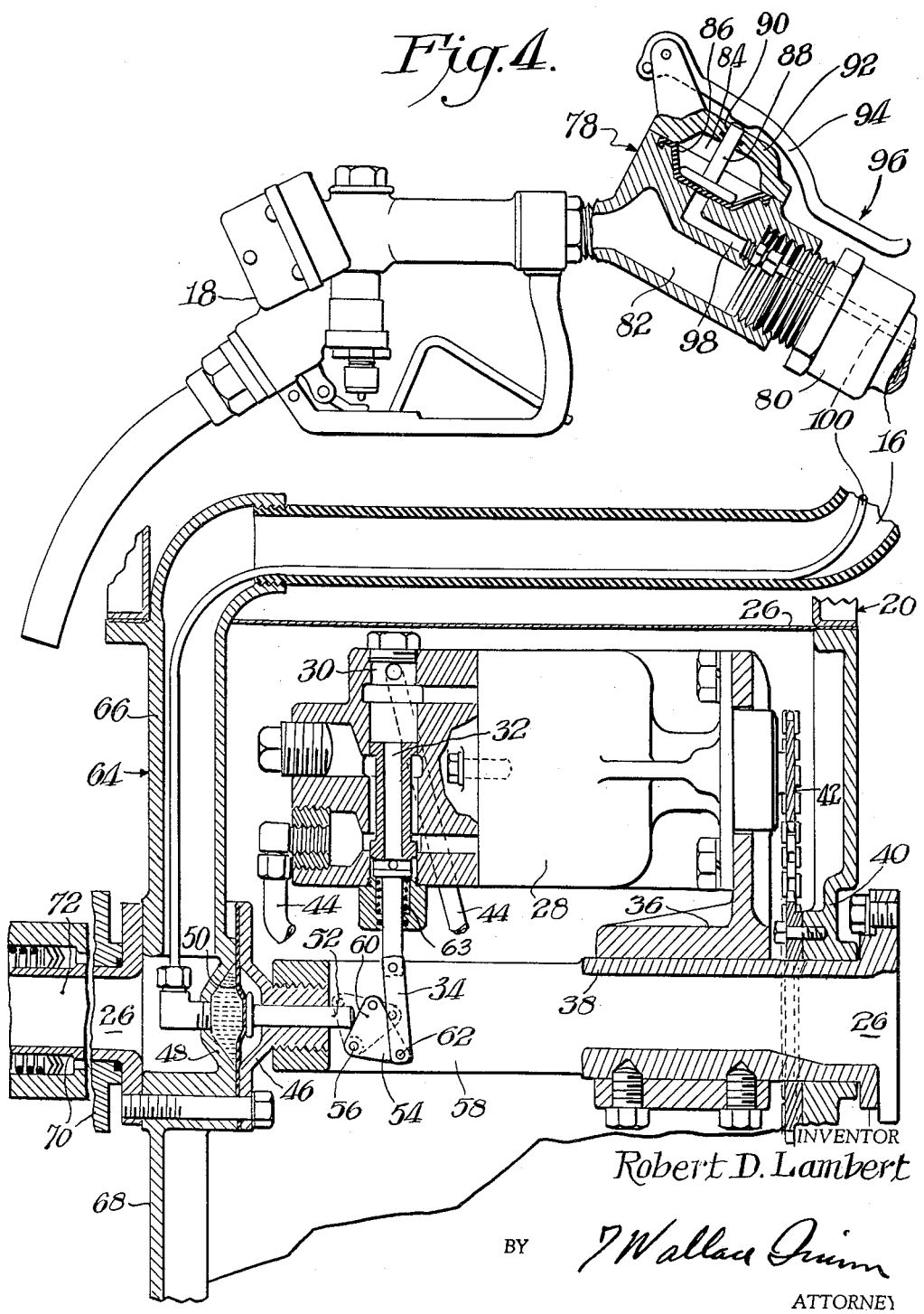

2,963,227
DEVICE FOR REMOTELY WINDING A REEL

Robert D. Lambert, Fort Wayne, Ind., assignor to Symington-Wayne Corporation, Salisbury, Md., a corporation of Maryland Filed June 6, 1958, Ser. No. 740,376

8 Claims. (Cl. 239—197)

This invention relates to a novel device for remotely actuating a motor-driven reel to wind a flexible line upon it, and more particularly relates to such a device which can be actuated from the end of the line remote from the reel.

Motor-driven reels are highly advantageous for storing relatively long or heavy flexible lines. They permit the line to be easily and conveniently wound and rewound upon the reel after an operation requiring the extension of this line has been completed. For example, the driver of a gasoline or oil tank truck is thereby assisted in rewinding the discharge hose after he has finished filling a storage tank.

However, because the controls for the reel rewind motor are usually located adjacent the reel upon the truck, the operator must walk back to the truck before the rewind motor can be started. This necessitates either dragging the rather heavy nozzle of the hose back with him or leaving it where it lies and picking it up some time later during the rewinding process. It would be highly advantageous if the operator could immediately start the reel rewind motor without letting go of the nozzle and hose to permit him to immediately almost automatically store the hose as he starts to walk towards the truck.

An object of this invention is to provide a device which permits an operator to start the rewinding action of a motor-driven reel from the end of a flexible line remote from the end of the reel upon which it is wound.

Another and more specific object is to provide a device which permits a tank truck operator to actuate the rewinding motion of a motor-driven hose reel from the nozzle end of the hose.

In accordance with this invention, a signal-generating means is mounted adjacent the end of a flexible line remote from the motor-driven reel upon which it is wound. This reel includes a relatively large hollow hub having associated therewith a reel driving motor and its controls which are stationarily mounted. An actuating means is operatively associated with the control means for the reel motor. A flexible conduit extends intimately along the flexible line and passes into the hollow hub thence into connection with the actuating means. An operator is thereby enabled to actuate the motor by actuating the signal-generating means at the end of the line remote from the reel to permit him to guide the line smoothly upon the reel as he walks towards it.

Novel features and advantages of the present invention will become apparent to one skilled in the art from a reading of the following description in conjunction with the accompanying drawings wherein similar reference characters refer to similar parts and in which:

Fig. 1 is a perspective view of a tank truck upon which an embodiment of this invention is mounted;

Fig. 2 is a side view in elevation of a portion of one embodiment of this invention;

Fig. 3 is a view in elevation, partially broken away in cross-section, taken through portions of the embodiment shown in Fig. 2; and Fig. 4 is a cross-sectional view in elevation, partially broken away, of interconnected portions of the embodiment shown in Figs. 1, 2 and 3.

In Fig. 1 is shown an embodiment 10 of this invention mounted, for example, in the rear of a tank truck 12. An operator 14, for example, the driver of the tank truck, is shown holding the end of flexible line 16, for example, a flexible hose, which is extended to permit nozzle 18 at the end of the hose 16 remote from reel 20 to be inserted within filling connection 22 mounted upon storage tank 24, for example, buried in the ground. Portions of device 10 which permit the driver 14 to operate the reel winding motor (later described) from the end of line 16 remote from the reel are described in detail in the following.

Figs. 2 and 3 illustrate in detail some of the operating components of this device. Reel 20 includes a hollow hub 26 within which, for example, is mounted driving motor 28 and control means 30 which is attached to it. Driving motor 28 is, for example, a fluid-operated motor, for example, including eccentrically engaged rotor and idler gears. Control means 30 is accordingly, for example, a control valve including a control piston 32 and an operating stem 34. Motor 28 is, for example, stationarily mounted upon a tubular bracket 36 which is attached to hollow shaft 38 about which bearing 40 in one end of hub 26 rotates. Motor 28 is connected to rotate hub 26, for example, through sprocket and chain drive assembly 42 which connects the driving shaft of the motor with a portion of hub 26 adjacent bearing 40. Fluid conduits 44 for supplying and carrying away operating fluid to motor 28 are inserted through hollow shaft 38. Motor 28 is, for example, fluid operated. However, an explosion-proof electrical motor might also be used.

An actuating means 46, for example, a pressure-responsive device for converting fluid pressure into mechanical motion, is mounted within hub 26, for example, upon the side of hub 26, approximately at its axis of rotation. Actuating means 46 includes, for example, a hollow casing 48 within which are mounted a flexible diaphragm 50 and an operating shaft 52. Operating shaft 52, for example, extends approximately along the axis of rotation of hub 26 to minimize its movement relative to driving motor 28 and a later described means for connecting it thereto as casing 48 rotates.

Operating shaft 52 of actuating means 46 is operatively associated with valve stem 34 through a cam and lever plate 54 which is, for example, rotatably mounted about pin 56 attached to extension 58 of hub 26. Shaft 52 bears against surface 60 of plate 54 and a remote portion of plate 54 is rotatably connected by pin 62 to the end of valve stem 34. As shaft 52 is moved backward and forward in response to pressure-actuated movement of diaphragm 50, valve stem 34 is accordingly moved back and forth to alternatively run and stop motor 28. A spring 63 reacts against stem 34 within motor 28 to maintain cam 54 in contact with shaft 52.

A rigid conduit 64 is incorporated in the side of hub 26 remote from bearing 40. Conduit 64 includes a leg 66 mounted substantially parallel to flange or spider 68 of hub 26 and a central leg 70 connected to leg 66 and disposed substantially perpendicular to it and disposed approximately along the axis of rotation of hub 26. Conduit leg 70 is connected to fluid supply piping 72, for example, through a rotatable joint 74. Fluid to be discharged through flexible line 16, shown wound about the outer surface of hub 26, for example, between flanges 76, is accordingly conducted through conduits 72 and 64 into hose 16.

As shown in detail in Fig. 4, a signal-generating means 78, for example, a pressure-generating means for converting mechanical motion into fluid pressure, is mounted adjacent nozzle 18 at the end of line 16 remote from reel 20. Nozzle 18 is represented, for example, as a conventional manually operable gasoline or oil discharge nozzle, and pressure-generating means 78 is, for example, constructed as a self-contained unit which is inserted between nozzle 18 and the fitting 80 at the end of hose 16 remote from reel 20.

Pressure-generating unit 78 includes, for example, a channel 82 through which fluid flows unimpeded from hose 16 into nozzle 18 and an auxiliary chamber 84 within which is mounted a flexible diaphragm 86 and an operating shaft 88.

Operating shaft 88 extends through an aperture 90 in the wall 92 of auxiliary chamber 84 and is operatively associated with a manually operable pivoted lever 94. Force exerted upon the end of lever 94 in the direction of arrow 96 moves diaphragm 86 downward compressing the fluid in the lower portion of auxiliary chamber 84 and providing a pressure impulse to channel 98 to which is connected a flexible conduit 100, for example, made of ⅛ nylon tubing. Flexible conduit 100 is connected intimately along the entire length of hose 16 by, for example, being inserted within hose 16.

As shown in Figs. 3 and 4, tube 100 passes within hose 16 and through rigid conduit 64 to connect with pressure-responsive actuating means 46 approximately at the axis of rotation of hub 26 to conduct a fluid impulse from pressure-generating means 78 to pressure-responsive means 46.

Operation

When an operator 14 has finished filling storage tank 24, he can immediately start driving motor 28 to rotate reel 20 and wind hose 16 about it as soon as he starts walking towards it by merely squeezing pivoted lever 94. This creates a pressure impulse within pressure-generating chamber 84 which is transmitted to pressure-responsive means 46 through flexible tubing 100.

Operating shaft 52 is thereby moved towards cam and lever plate 54 which is rotated about pin 56 to cause a downward movement of valve stem 34 which moves valve piston 32 in a direction admitting a supply of operating fluid to motor 28 which actuates rotation of motor 28 and sprocket-connected hub 26.

As operator 14 moves towards truck 12, he smoothly guides hose 16 between flanges 76 of reel 20; and, when hose 16 is completely wound, release of pivoted lever 94 automatically stops rotation of motor 28 and hub 26. If desired, level wind devices may be associated with reel 20 to automatically wind hose 16 smoothly in layers upon reel 20.

What is claimed is:

1. A remotely-actuated device for winding a flexible line upon a reel comprising a reel having a hollow hub, a driving motor stationarily mounted within said hub, a control means operatively associated with said driving motor, an actuating means mounted within said hub and operatively associated with said control means, a signal-generating means mounted adjacent the end of said flexible line remote from said reel, a flexible conduit extending along said flexible line, said flexible conduit passing into said hollow hub into connection with said actuating means to permit an operator to actuate the driving motor as he approaches the reel holding the end of the line remote from it.

2. A device as set forth in claim 1 wherein said signal-generating means is a pressure-generating device which converts mechanical motion into fluid pressure, and said actuating means is a pressure-responsive device which converts fluid pressure into mechanical motion.

3. A device as set forth in claim 1 wherein said flexible line is a hose and said flexible conduit is a relatively small flexible tubing inserted within said hose.

4. A device as set forth in claim 3 wherein said signal-generating means is a pressure-generating means incorporated within a casing, said casing being channelled, and said casing being connected between a nozzle and the end of the hose remote from said reel with the channel within said casing conducting fluid from said hose to said nozzle.

5. A device as set forth in claim 4 wherein said casing includes a pressure-generating chmaber incorporating a diaphragm and an operating shaft extending through said casing, and a manually-operable pivoted lever is operatively associated with the external portion of said operating shaft.

6. A device as set forth in claim 3 wherein said hose is connected to a rigid conduit extending radially within said hub from the outer surface of said hub to its axis of rotation, said actuating means being mounted upon said rigid conduit within said hub approximately at its axis of rotation, and said flexible tube passes through said rigid conduit approximately at its axis of rotation into connection with said actuating means.

7. A device as set forth in claim 6 wherein said actuating means is a pressure-responsive device including a diaphragm and an actuating shaft, and said actuating shaft being aligned approximately along the axis of rottion of said hub.

8. A device as set forth in claim 7 wherein said driving motor is a fluid-driven motor including a valve for starting and stopping its motion, a linearly movable stem being connected to said valve, and cam and lever means operatively associating said stem with said operating shaft of said actuating means to permit the movement of said motor to be controlled in response to changes of pressure within said actuating means.

References Cited in the file of this patent

UNITED STATES PATENTS

| | | |
|---|---|---|
| 2,573,868 | Newell | Nov. 6, 1951 |
| 2,583,181 | Kunz | Jan. 22, 1952 |
| 2,669,483 | Fletcher | Feb. 16, 1954 |

FOREIGN PATENTS

| | | |
|---|---|---|
| 714,393 | Great Britain | Aug. 25, 1954 |